(12) United States Patent
O'Donoghue et al.

(10) Patent No.: US 9,285,959 B2
(45) Date of Patent: Mar. 15, 2016

(54) TRANSITIONING PAGES OF PAGINATED CONTENT DISPLAYED BY A COMPUTING DEVICE

(71) Applicant: Kobo Inc., Toronto (CA)

(72) Inventors: Tony O'Donoghue, Toronto (CA); Charles Joseph, Toronto (CA)

(73) Assignee: Kobo Inc., Toronto (CA)

( * ) Notice: Subject to any disclaimer, the term of this patent is extended or adjusted under 35 U.S.C. 154(b) by 247 days.

(21) Appl. No.: 13/889,185

(22) Filed: May 7, 2013

(65) Prior Publication Data

US 2014/0337787 A1  Nov. 13, 2014

(51) Int. Cl.
*G06F 3/048* (2013.01)
*G06F 3/0483* (2013.01)

(52) U.S. Cl.
CPC .................................. *G06F 3/0483* (2013.01)

(58) Field of Classification Search
CPC ......................... G06F 3/0483; G06F 15/0291
USPC .......................................... 715/776; 345/473
See application file for complete search history.

(56) References Cited

U.S. PATENT DOCUMENTS

| 6,243,074 | B1 | 6/2001 | Fishkin et al. | |
|---|---|---|---|---|
| 2003/0169234 | A1 | 9/2003 | Kempisty | |
| 2008/0079692 | A1 | 4/2008 | Liang et al. | |
| 2008/0259057 | A1* | 10/2008 | Brons | 345/184 |
| 2011/0050591 | A1 | 3/2011 | Kim et al. | |
| 2011/0296334 | A1* | 12/2011 | Ryu et al. | 715/776 |
| 2012/0110442 | A1 | 5/2012 | Sharkey | |
| 2012/0198330 | A1 | 8/2012 | Koppel et al. | |
| 2013/0227398 | A1 | 8/2013 | Bolstad | |
| 2013/0335387 | A1* | 12/2013 | Emerton et al. | 345/207 |

OTHER PUBLICATIONS

International Search Report and Written Opinion, mailed Mar. 2, 2015, for related application PCT/JP2014/005868, filed Nov. 21, 2014, 9 pages.

* cited by examiner

*Primary Examiner* — Matthew Ell
(74) *Attorney, Agent, or Firm* — Oblon, McClelland, Maier & Neustadt, L.L.P.

(57) ABSTRACT

A given page of an e-book is displayed when an input is detected that is sustained for an amount of time that exceeds a threshold. After the amount of time exceeding the threshold, the pages of the e-book are transitioned by clusters or chapters. The transitioning by clusters or chapters can be sustained for some duration that is determined by, for example, the duration of time during which the input is sustained.

20 Claims, 5 Drawing Sheets

TRANSITIONING PAGES OF PAGINATED CONTENT DISPLAYED BY A COMPUTING DEVICE

TECHNICAL FIELD

Examples described herein include a computing device for displaying paginated content, and more specifically, a system and method for transitioning pages of paginated content displayed by a computing device.

BACKGROUND

"E-books" are a form of an electronic publication that can be viewed on computing devices with suitable functionality. Mufti-function devices, such as cellular-telephony or messaging devices, can utilize specialized applications (E.g., e-reader application) to view e-books. Still further, some devices (sometimes labeled as "e-readers") can be centric towards content viewing, and e-book viewing in particular.

DETAILED DESCRIPTION

Examples described herein include a computing device that can transition the displayed pages of an e-book by chapter or by cluster. Among other benefits, examples such as described herein enable a user to utilize an e-book in a manner that is similar to how the user would interact with a hardbound or physical book. For example, a user can operate a computing device in a manner that enables pages to be flipped by clusters or by chapters.

In some embodiments, an input action received by a computing device can be interpreted as one of multiple possible page turning inputs. In particular, an input action can be interpreted for turning pages by clusters or chapters based on the input action being provided with an attribute that denotes an intent for the user to flip pages by clusters or chapters. In some embodiments, for example, a user can tap or touch a portion of the display to cause a single page to flip. To denote page flipping by clusters or chapters, the user can touch and hold the portion of the display.

In an embodiment, a given page of an e-book is displayed when an input is detected that is sustained for an amount of time that exceeds a threshold. After the amount of time exceeding the threshold, the pages of the e-book are transitioned by clusters or chapters. The transitioning by clusters or chapters can be sustained for some duration that is determined by, for example, the duration of time during which the input is sustained.

According to some embodiments, an input feature is provided to enable the user to return to the given page upon after the pages of the e-book have been transitioned to a new page as a result of the sustained input.

Still further, in some embodiments, a computing device includes one or more processors, a memory that stores an e-book, and an input screen. The one or more processors operate to display a given page of the e-book on the input screen, and detect that a user has touched the input screen for an amount of time that exceeds a threshold. After the amount of time exceeds the threshold, the pages of the e-book transition by page clusters or chapters while the input remains sustained. An input feature on the input screen enables the user to return to the given page upon the input being complete.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System and Device Description

Figure 1:
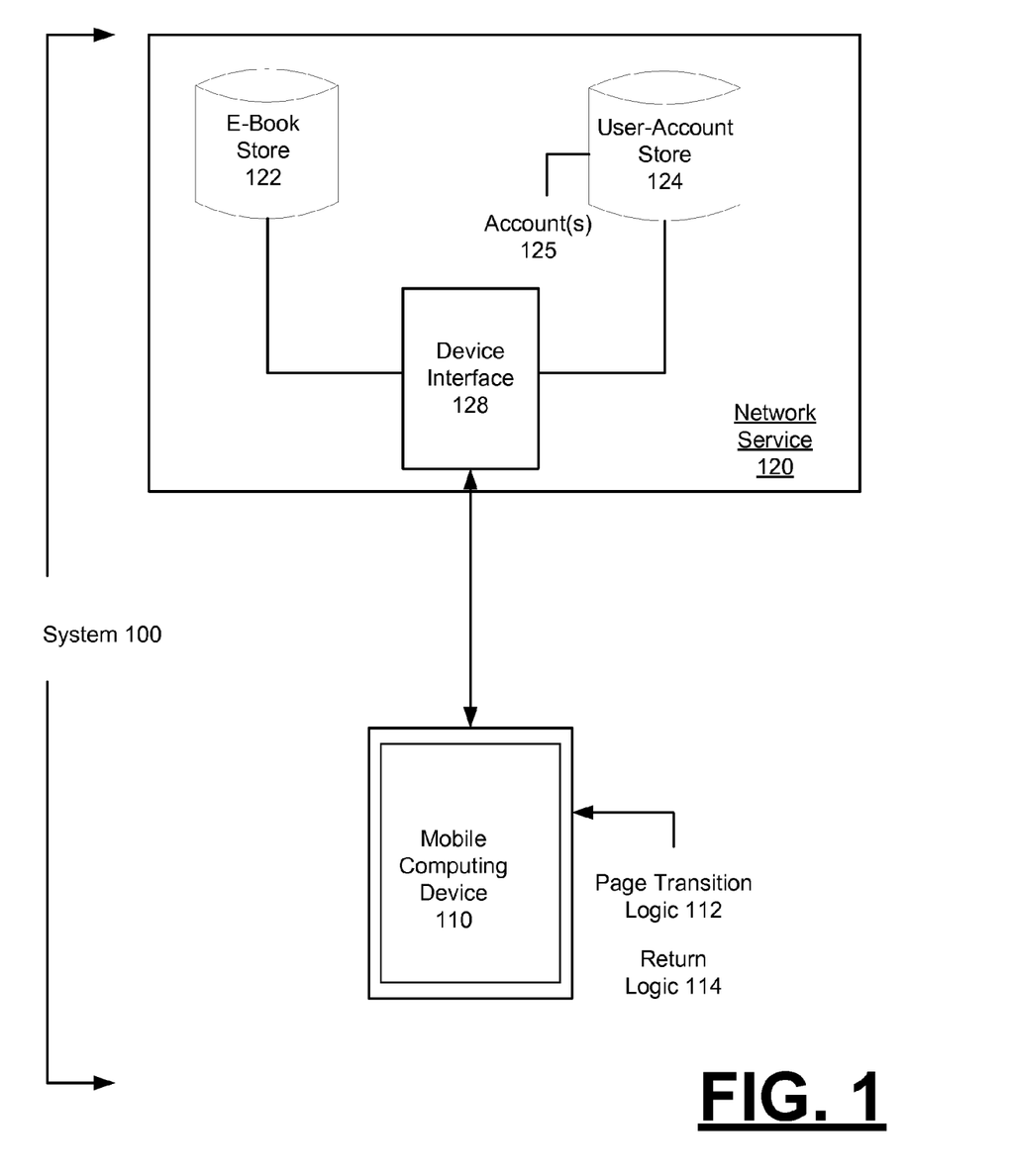
FIG. 1 illustrates a system for providing e-books on a computing device, according to an embodiment.

FIG. 1 illustrates a system for providing e-books on a computing device, according to an embodiment. A system 100 includes a mobile computing device 110 and a network service 120. The network service 120 may include multiple servers and other computing resources that provide various e-book services, including services in which e-books are sold, shared, downloaded and/or stored. The mobile computing device 110 can correspond to any computing device on which an e-book can be rendered and consumed. For example, the mobile computing device 110 can correspond to a tablet, telephony/messaging device (e.g., smart phone) or portable computing device. The mobile computing device 110 can run an e-reader application that links the device to the network service 120 and enables e-books provided through the service to be viewed and consumed.

In some implementations, the mobile computing device 110 is equipped with hardware and software to optimize reading electronic content, including e-books. For example, the mobile computing device 110 can have a tablet like form factor, although variations are possible. In some cases, the mobile computing device 110 can also have an E-ink display.

The network service 120 can include a device interface 128, which communicates with individual devices that access the service. Among other resources, the network service 120 can include an e-book store 122 and a user account store 124. The user account store 124 can associate mobile computing device 110 with a user and an account 125. The account 125 can also be associated with one or more e-books, which can be stored in the e-book store 122. As described further, the user account store 124 can retain metadata for individual accounts 125 to identify e-books that have been purchased or made available for consumption for a given account. The mobile computing device 110 may be associated with the user account 125, and multiple devices may be associated with the same account. As described in greater detail below, the mobile computing device 110 can store e-books that are purchased or otherwise made available to the user of the mobile computing device 110, as well as archive e-books that have been purchased for the user account 125, but are not stored on the particular mobile computing device.

In some embodiments, mobile computing device 110 includes page transition logic 112 and return logic 114. The page transition logic 112 enable the users to transition pages of an e-book either one at a time, or by clusters (e.g., by chapters). The return logic 114 can mark the starting point from when the user initiated a page transition event (e.g., provided input to transition pages). As described with various examples, the return logic 114 can return the user to the page or page state (e.g., set of pages on display at one time) when the user initiated a page transition input or series of such inputs.

Figure 2:
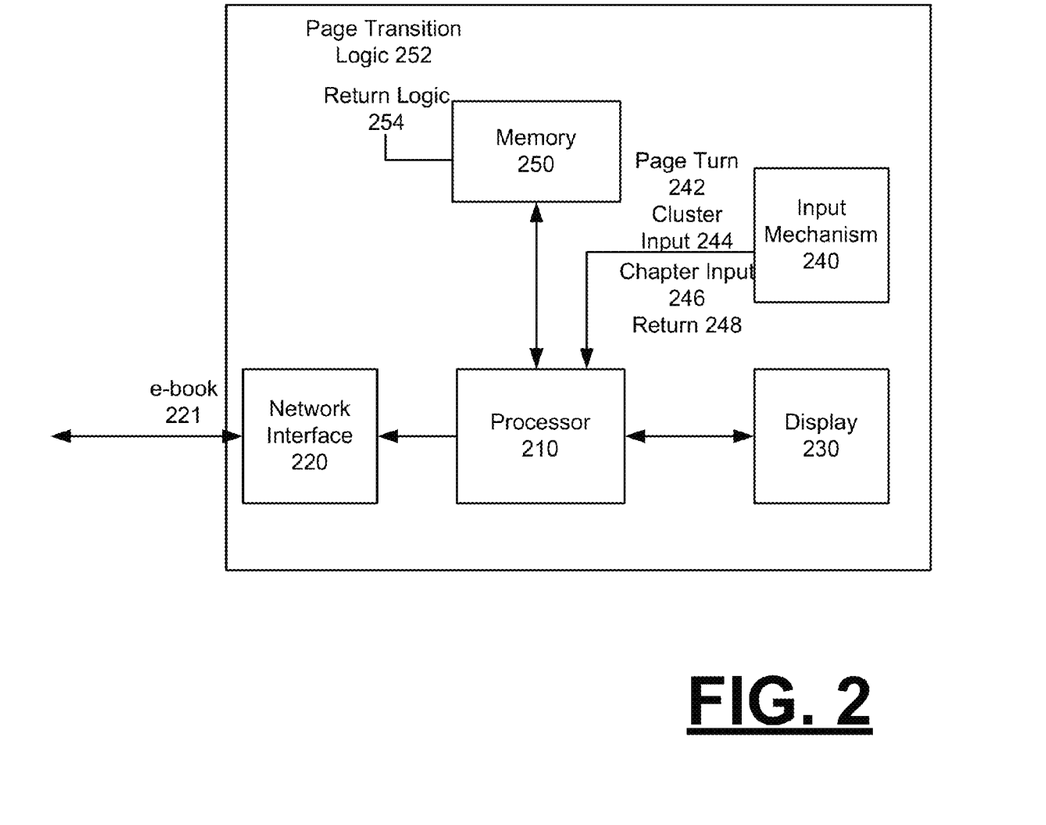
FIG. 2 illustrates an example of a mobile computing device, according to an embodiment.

FIG. 2 illustrates an example of a mobile computing device, according to an embodiment. The mobile computing device 110 can include a processor 210, a network interface 220, a display 230, one or more input mechanisms 240, and a memory 250. The processor 210 can utilize the network interface 220 to communicate with a network service 120 (see FIG. 1). In communicating with the network service 120, the mobile computing device 110 can receive e-books 221 that the user has purchased or otherwise selected to download from the network service. The e-books 221 that are downloaded onto the mobile computing device 110 may be stored in the memory 250.

The display 230 can correspond to, for example, a liquid crystal display (LCD) that illuminates in order to provide content generated from processor 210. In alternative variations, for example, the display 230 can be an E-ink display with a white-paper appearance to enhance readability.

In some embodiments, the user may operate the mobile computing device 110 to transition (e.g., flip) trough pages of an e-book. The memory 250 can store page transition logic 252, which can be executed to (i) determine when a user input should be interpreted as an input to transition pages by clusters or chapters, and (ii) transition pages by clusters or chapters based on, for example, a duration during which the input for the page transition is received. In some implementations, the memory 250 can also store return logic 254 which records the starting point from when one or more page transition events are received. The return logic 254 enables the computing device to be responsive to a specific input by reverse transitioning the page state (pages on display) of the computing device to the recorded starting point.

The processor 210 can implement page transitions based on input it receives through the input mechanism 240. The input mechanism 240 can correspond to, for example, a touch sensitive surface, such as one integrated with the display 230 (e.g., touch screen). As another example, the input mechanism 240 can correspond to a button or switch that the user can press or otherwise actuate. According to some embodiments, the input mechanism 240 can be operated to enable the user to specify an input corresponding to any one of (i) a page turn 242, (ii) a cluster page input 244, and/or (iii) a chapter input 246. In response to the page turn 242, the processor 210 may advance the page or page state of the e-book by a single increment. Thus, for example, if a single page is displayed, then the page turn 242 advances the e-book to the next page. If the page state reflects two or four pages, then the page turn 242 advances the page state to the next set of two or four pages.

In response to the cluster page input 244, the processor 210 can transition to a page that is a cluster (e.g., 10) from the starting page or page state. In the cluster input, the pages are transitioned without regard to chapter designations (if chapter designations are present). If the input is maintained, the cluster page input 244 can be repeated. In some variations, the magnitude of the cluster input can determine the number of pages that are transitioned as a result of the input. Optionally, the magnitude can reflect both a total value and/or a velocity in terms of the number of pages that are transitioned per unit of time. In one implementation, the magnitude of the cluster page input 244 (corresponding to the number of pages in the cluster) can be determined from, for example, a duration of the cluster page input 244.

Likewise, the chapter input 246 can advance the page state of the e-book to the next chapter, and to subsequent chapters thereafter. The chapters of the e-book can be predefined by, for example, a publisher of the e-book. The chapter input 246 can be provided as an alternative to cluster page input 244.

Additionally, the input mechanism 240 can be used to enable the user to specify a return input 248. The return input returns the e-book to a page state that existed prior to the page transition input being received. Thus, for example, if the user loses track of the page state, the user can enter the return input 248 to return the page state of the e-book to the starting page state. In one implementation, the input mechanism 240 is provided by way of one or more software based features that are provided on, for example, the display 230. In one implementation, at least two of the various page transition inputs are specified from the same feature, but are distinguished by the duration in which the input is sustained (e.g., length of time during which the user keeps contact with the feature). If for, example, the user maintains contact for a duration that is less than a designated threshold, then the input is interpreted as page turn 242. If, on the other hand, the user maintains contact for a duration that exceeds the designated threshold, then the input is interpreted as the cluster or chapter input 244, 246. In variations, the page turn 242 and the cluster or chapter inputs 244, 246 can be distinguished by gestures or by mufti-touch variations (e.g., two fingers used to flip by chapters, one finger to transition by single page). Additionally, in some implementations, the input features can be separated. For example, the return input 248 can be provided from a separate feature than that of the page transitions (page turn 242 or cluster page input 244).

The processor 210 can communicate the page state of any e-book in use to the network service 120. The network service 120 can track the page state of the individual e-books in use by the user so that the most recent page state of any e-book can be replicated on any of multiple devices associated with the particular user's account.

Figure 3:
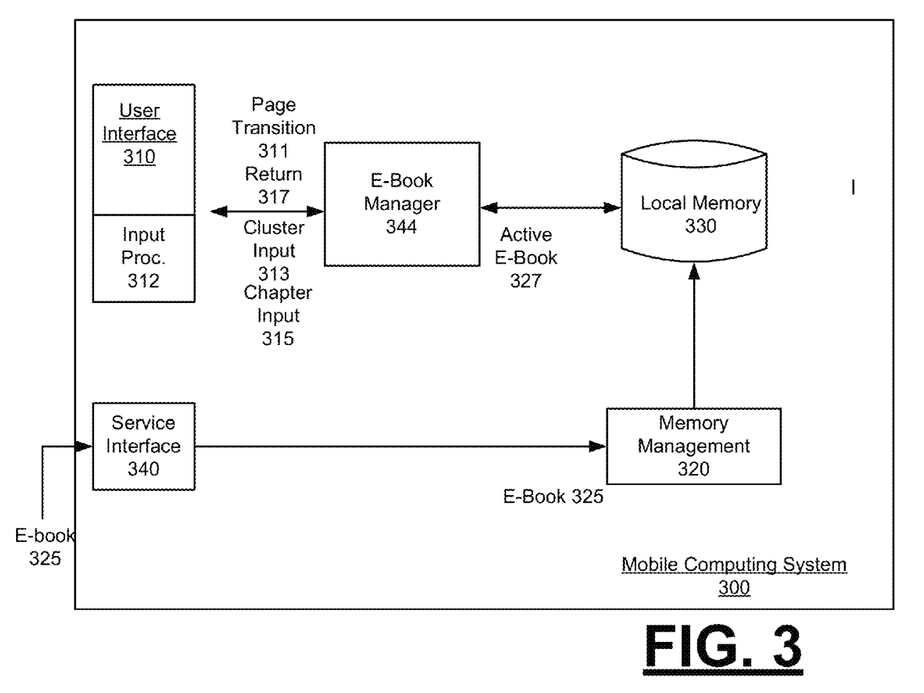
FIG. 3 illustrates a device system for transitioning pages of paginated content displayed on a computing device, according to one or more embodiments.

FIG. 3 illustrates a device system for transitioning pages of content displayed on a computing device, according to one or more embodiments. In reference to FIG. 3, a mobile computing system 300 can implement programmatic components for transitioning pages of paginated content, as well as providing other functionality such as communicating with an e-book service (such as network service 120, shown in FIG. 1). In some implementations, the mobile computing system 300 can be implemented as an application that runs on a mobile computing device (e.g., such as shown by FIG. 1 or FIG. 2).

In an example of FIG. 3, the mobile computing system 300 includes a user interface 310, a memory management module 320, a local memory 330, a service interface 340 and an e-book manager 344. The programmatic components shown with the computing system 300 can be provided as part of an application that runs on the computing system 300. For example, the user can download an application onto mobile computing device, to obtain functionality such as described herein, as well as to communicate with a network service 120. Alternatively, the application can be embedded or otherwise preinstalled with other programmatic elements for providing such functionality on a computing device.

The service interface 340 includes application and logic which enables the device to use, for example, a wireless Internet connection, to connect to the network service 120 (see FIG. 1). In connecting with the service, the service interface 340 can transmit data that enables the network service 120 to identify mobile computing system 300 (or alternatively the user) so that the network service 120 can determine the account associated with the mobile computing device. The service interface 340 can be used to retrieve e-books 325 from the network service 120. For example, in identifying the mobile computing system 300 to the network service 120, the network service may be able to procure payment information (e.g., stored credit card) that can be used to charge users account when purchasing a new e-book. Each e-book 325 can correspond to a literary work, having pagination and chapter designations.

In identifying the mobile computing system 300, the network service 120 can identify what e-books belong to the account of that device. E-books that are transmitted to the mobile computing system 300 include those that are purchased from the device, or those that the user requested to download. In variations, e-books can automatically be downloaded to the device in response to the occurrence of certain conditions. For example, the user can purchase an e-book on another device, and then subsequently connect to the network service 120 via the mobile computing system 300 to automatically receive their previously purchased e-book. Alternatively, network service 120 can be configured to push e-books to the mobile computing system 300, based on, for example, user account settings, subscription rules, and various other business logic considerations. The memory management module 320 can manage the storage of downloaded e-books in the local memory of the mobile computing system 300 for storage and use.

Among other functionality, the user interface 310 can include an input processing component 312 to interpret select kinds of inputs entered through the user interface 310. In some embodiments, the input entered through the user interface 310 corresponds to page transition input. The input processing component 312 can interpret input from a user of the computing device as (i) a single page transitions 311 (or page state transition), (ii) cluster input 313, and/or (iii) chapter input 315. The cluster input 313 and/or the chapter input 315 can be communicated with a value that indicates number of pages or chapters. In one implementation, the input processing component 312 can interpret whether an input action is single page transitions 311 or cluster/chapter input 313, 315 based on a duration of the input action. The duration of the input action can also be used to determine a magnitude of the cluster/chapter input 313, 315. Still further, in one implementation, the user can designate cluster versus chapter input with separate kinds of input. For example, cluster input can be entered by the user holding an input (e.g., user touches screen and holds finger in place), while chapter input can be designated by the user altering the input or specifying an additional action (e.g., tap/hold touchscreen and then drag down). When the input is cluster input, the pages can be flipped in bunches and/or rapidly, and when the input is by chapter, the pages can be flipped by chapter.

The input processing component 312 can also process an input action as a return input 317. In some implementations, the input action of the return input 317 can be different than the input action for page transitions. The return input 317 can return the page state to that which was present before a page transition input was received.

The e-book manager 344 provides functionality to implement page transitions in an actively viewed e-book 327. The interpreted input provided through the user interface 310 can be communicated to an e-book manager 344, which implements the page or page state transitions (including return input 317) in accordance with the input. The page or page state transitions can also be inputted with a magnitude that coincides with a value determined from the input. Thus, for page transitions the e-book manager 344 can advance through pages of active e-book in accordance with the input and the value of the input. For return input 317, the e-book manager can track the originating page or page state, and reverse transition to the originating page or page state.

Methodology

Figure 4:
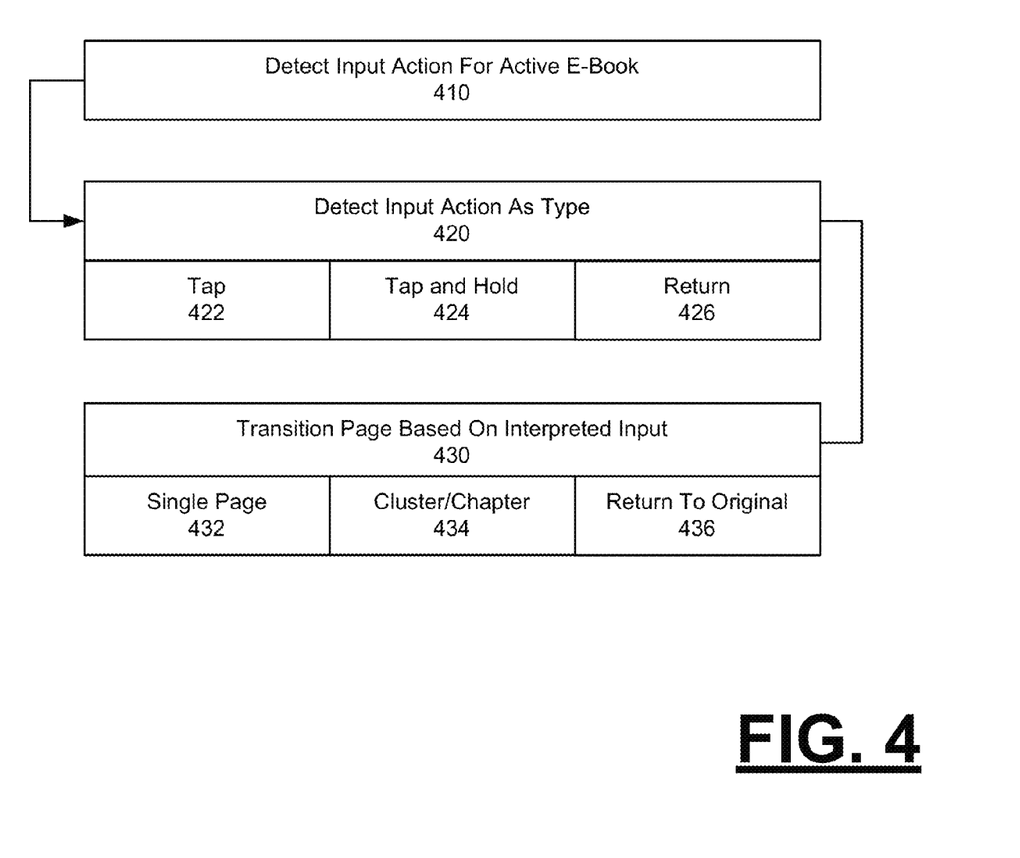
FIG. 4 illustrates a method for implementing page transitions, according to an embodiment.

FIG. 4 illustrates a method for implementing page transitions, according to an embodiment. A method such as described with an example of FIG. 4 may be implemented using components such as described with FIG. 1, FIG. 2 or FIG. 3. Accordingly, reference may be made to elements of other figures for purpose of illustrating suitable elements or components for performing a step or sub-step being described.

With reference to FIG. 4, a computing device operates to detect an input action for an active e-book (410). An active e-book can correspond to the e-book that the user is viewing at an instance when the input action is detected. Upon the input action being detected, the input action is interpreted.

The input action can be detected as a specific type of action that correlates to an input type (420). In one embodiment, the input action can be detected as a tap, tap and hold or a return.

In one implementation, the tap can correspond to a discrete instance when the user contacts a designated region of an input surface (e.g., on a touch screen) with an object (including finger), followed by a lift-up of the object. If the duration during which the object is in contact with the screen is less than a designated threshold of time, then the input action is deemed a tap (422).

If the duration during which the object is in contact with the screen is greater than the designated threshold of time, then the input action is deemed a tap and hold (424). In variations, additional inputs can also be determined, such as additional input corresponding to tap, hold and drag.

The input action can also be detected as a return (416). In an embodiment, the input action is detected as a return based on the location or selection of input mechanism. For example, the location of an input action on a touch screen display that is detected as a return may differ from the location of the input action that is to be detected as a page transition. Additionally, in some implementations, the action can be detected as a return only if it follows a multi-page transition input.

The input action can be interpreted for page transitions (430). Based on the input, the page transition can transition a page or page state (e.g., multiple page son display at one time) of the e-book. In one implementation, an input action corresponding to a tap can be processed as a single page or page state transition (432). Likewise, an input action corresponding to a tap and hold can be processed as a mufti-page input, where page transitions occur in clusters or chapters (434). The magnitude of the page transitions can be based on the duration of the tap and hold. In some implementations, when the tap and hold is detected, the multi-page transitions can occur after a single page transition.

Additionally, in some variations, different inputs can be used to distinguish chapter transitions from page flipping. For example, a tap and hold can be interpreted as page flipping (i.e., cluster), while the action of tap, hold and drag (e.g., downward) can be interpreted as a chapter transition input.

Still further, an input action corresponding to a return can cause the page state of the e-book to revert to an original state, prior to a most recent input action from which one or more page transitions were interpreted (436).

EXAMPLES

FIG. 5A through FIG. 5D illustrate examples of a computing device that is configured to implement a mufti-page transition based on a designated input action. Examples such as described with FIG. 5A through FIG. 5D can be implemented using a computing device such as described with examples of FIG. 1, FIG. 2 or FIG. 3.

Figure 5A:
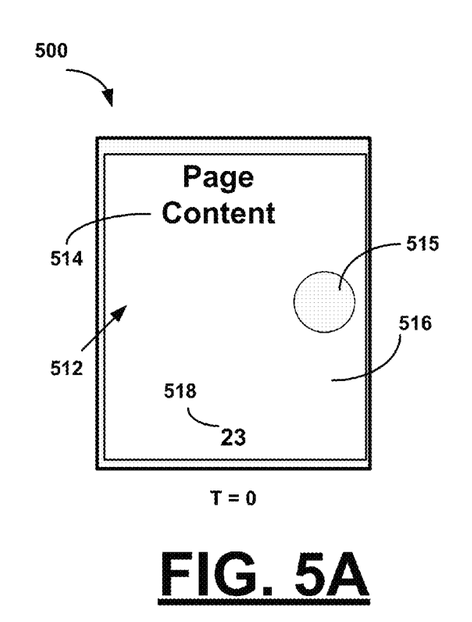
FIG. 5A through FIG. 5D illustrate examples of a computing device that is configured to implement a mufti-page transition based on a designated input action.

In FIG. 5A, a computing device 500 includes a touch screen 512 through which an e-book content 514 is rendered. The computing device 500 may be configured to detect input actions of specific types. In an example shown, the computing device 500 is structured to receive page transition inputs when the input is provided at an edge of the display screen. In some variations, the multiple locations for receiving the input may be provided. For example, the page transition input can be received on either a left or right edge of the display screen, to signify forward or backward page transitions.

FIG. 5A illustrates the page state of the content 514 at time T=0. At T=0, the page of the content 514 can be set to a designated value 518 (e.g., page count=23). In the example provided, at T=0, an input 515 is received at an edge region 516 of the content.

Figure 5B:
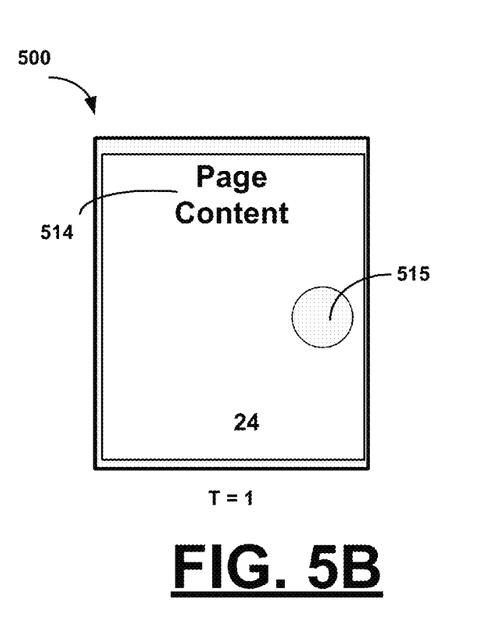

FIG. 5B illustrates the page state of the content 514 at a time before the input is detected as being a mufti-page input (e.g., T=1), following the input 515 being received. Thus, at T=1, the duration of the input can be assumed to be less than the threshold from which the input is interpreted as a multi-page transition input. The page content 514 is transitioned or advanced to a next page from the page value 518 of T=0. Thus, the page value 518 may transition by one in the duration that is less than the designated threshold.

Figure 5C:
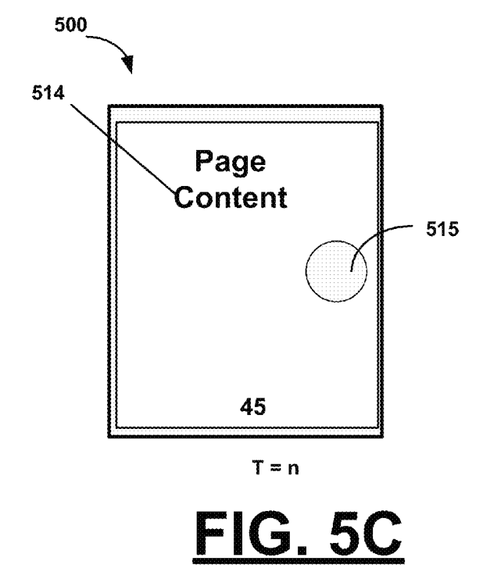

FIG. 5C illustrates the page state of the content 514 at a time after the input is detected as being a multi-page input (e.g., T=n), during which time the input 515 being received and sustained. The page state at T=n reflects the computing device 500 transitioning a cluster of pages (e.g., one or more chapters) forward from the page state at T=0. The number of pages reflected by the transition can be based on the value of n. Still further, the user can designate an input as a chapter transition by tapping, holding and dragging (e.g., downward) at the edge region 516.

Figure 5D:
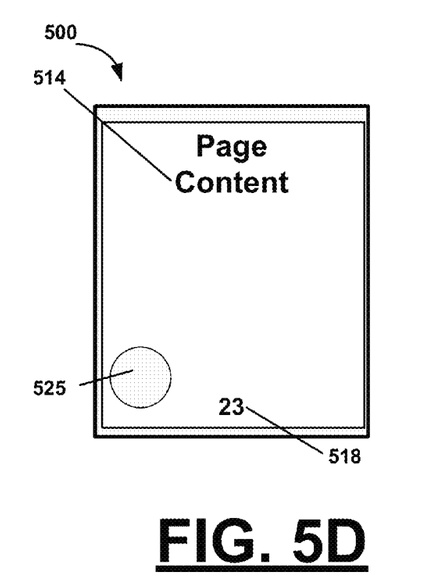

FIG. 5D illustrates the page state of the content 514 in response to the user providing a return input 525 after input 515 is completed. The return input 525 can be provided by a user contacting an object or finger at a second region of the touch screen. When the return input 525 is provided, the page state of the content 514 returns to that which precedes the input 515 being received. Thus, for example, the page value 518 is returned to the value at T=0.

With reference to FIG. 5A through FIG. 5D, the input 515 can also include a directional aspect. For example, the input 515 can be provided on an edge region of the paginated content 514 that is on the left side of the display area. The directional aspect can indicate whether the page transitions are forward or backward.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

What is claimed is:

1. A method for displaying an e-book on a computing device, the method comprising:
    displaying the e-book in a first page state, the first page state including at least a given page of an e-book, the e-book including a plurality of pages divided into multiple predefined chapters;
    detecting a first input that is sustained for an amount of time that exceeds a threshold, wherein detecting the first input includes detecting one or more gestures on an input surface, at least some of the one or more gestures corresponding to an input for transitioning by clusters of multiple pages;
    determining a type for the first input by at least determining whether the one or more gestures further include an additional gesture associated with an input for transitioning by chapters, the type of the first input being (i) the input for transitioning by clusters when the one or more gestures do not include the additional gesture or (ii) the input for transitioning by chapters when the one or more gestures include the additional gesture;
    after the amount of time exceeding the threshold, transitioning pages of the e-book by page clusters or chapters based on the determined type so that the e-book is transitioned into a second page state that displays one or more pages that are further in a progression in the e-book with respect to the given page;
    detecting a second input that follows the first input; and
    in response to detecting that the second input follows the transitioning pages of the e-book by page clusters or chapters, returning the e-book to the first page state.

2. The method of claim 1, wherein the transitioning pages of the e-book by page clusters or chapters is performed for a duration that is based on a duration during which the first input is sustained.

3. The method of claim 1, further comprising providing an input feature enabling a user to specify the second input.

4. The method of claim 1, wherein detecting the first input includes detecting that a user has touched an input screen of the computing device.

5. The method of claim 4, wherein detecting the first input includes detecting that the user has touched the input screen at a location corresponding to an edge region of the e-book.

6. The method of claim 4, wherein the transitioning pages of the e-book by page clusters or chapters includes transitioning through the e-book by chapters while the user touches the input screen.

7. The method of claim 1, wherein detecting the first input includes detecting a directional aspect of the first input, and wherein the transitioning pages of the e-book by page clusters or chapters is directional in accordance with the detected directional aspect.

8. The method of claim 1, further comprising:
while the first input is sustained for an amount of time that is less than the threshold, transitioning pages of the e-book by single pages while the first input remains sustained.

9. The method of claim 1, further comprising providing a visual feedback while transitioning pages of the e-book by clusters.

10. The method of claim 1, further comprising determining a duration during which the first input is sustained, and wherein transitioning the pages of the e-book comprises flipping the pages of the e-book at a velocity based on the determined duration.

11. A method for displaying an e-book on a computing device, the method comprising:
displaying the e-book in a first page state, the first page state including at least a given page of the e-book, the e-book including a plurality of pages and a plurality of chapters;
detecting a first input corresponding to a user touching an input screen of the computing device for an amount of time that exceeds a threshold, wherein detecting the first input includes detecting one or more gestures on the input screen, at least some of the one or more gestures corresponding to an input for transitioning by clusters of multiple pages;
determining a type for the first input by at least determining whether the one or more gestures further include an additional gesture associated with an input for transitioning by chapters, the type of the first input being (i) the input for transitioning by clusters when the one or more gestures do not include the additional gesture or (ii) the input for transitioning by chapters when the one or more gestures include the additional gesture;
after the amount of time exceeds the threshold, transitioning pages of the e-book by chapters based on the determined type while the first input remains sustained so that the e-book is transitioned into a second page state that displays one or more pages that are further in a progression in the e-book with respect to the given page;
detecting a second input that follows the first input; and
in response to detecting that the second input follows the transitioning pages of the e-book by chapters, returning the e-book to the first page state.

12. The method of claim 11, further comprising:
providing an input feature enabling the user to specify the second input.

13. The method of claim 11, wherein detecting the first input includes detecting that the user has touched the input screen at a location corresponding to an edge region of the e-book.

14. The method of claim 11, wherein detecting the first input includes detecting a directional aspect with respect to the user touching the input screen, and wherein the transitioning pages of the e-book by chapters is directional in accordance with the detected directional aspect.

15. The method of claim 11, further comprising:
while the user touches the input screen for an amount of time that is less than the threshold, transitioning pages of the e-book by single pages while the touch remains sustained.

16. The method of claim 11, further comprising providing a visual feedback while transitioning pages of the e-book by chapters.

17. A computing device comprising:
one or more processors;
a memory that stores an e-book, the e-book including a plurality of pages;
an input screen;
wherein the one or more processors operate to:
display the e-book in a first page state, the first page state including at least a given page of the e-book, the e-book including a plurality of pages divided into multiple predefined chapters;
determine, as a first input, that a user has touched the input screen for an amount of time that exceeds a threshold, wherein determining that the user has touched the input screen for the amount of time that exceeds the threshold includes determining one or more gestures on the input screen, at least some of the one or more gestures corresponding to an input for transitioning by clusters of multiple pages;
determine a type for the first input by at least determining whether the one or more gestures further include an additional gesture associated with an input for transitioning by chapters, the type of the first input being (i) the input for transitioning by clusters when the one or more gestures do not include the additional gesture or (ii) the input for transitioning by chapters when the one or more gestures include the additional gesture;
after the amount of time exceeds the threshold, transition pages of the e-book by page clusters or chapters based on the determined type so that the e-book is transitioned into a second page state that displays one or more pages that are further in a progression in the e-book with respect to the given page;
determine that a second input follows the first input; and
in response to determining that the second input follows the transitioning pages of the e-book by page clusters or chapters, return the e-book to the first page state.

18. The computing device of claim 17, wherein the one or more processors determine that the user has touched a location of the input screen corresponding to an edge region of the e-book.

19. The computing device of claim 17, wherein the one or more processors determine a directional aspect of the user's touching of the input screen, and wherein the one or more processors operate to transition the pages of the e-book in accordance with the determined directional aspect.

20. The computing device of claim 17, further comprising providing a visual feedback while transitioning pages of the e-book by clusters or chapters.

* * * * *